US007944483B2

(12) United States Patent
Zhang

(10) Patent No.: US 7,944,483 B2
(45) Date of Patent: May 17, 2011

(54) APPARATUS, METHOD AND PROGRAM FOR PHOTOGRAPHY

(75) Inventor: Yitong Zhang, Asaka (JP)

(73) Assignee: Fujifilm Corporation, Tokyo (JP)

( * ) Notice: Subject to any disclaimer, the term of this patent is extended or adjusted under 35 U.S.C. 154(b) by 688 days.

(21) Appl. No.: 11/979,634

(22) Filed: Nov. 6, 2007

(65) Prior Publication Data

US 2008/0122944 A1  May 29, 2008

(30) Foreign Application Priority Data

Nov. 7, 2006  (JP) .................................. 2006-301501

(51) Int. Cl.
*H04N 5/228* (2006.01)

(52) U.S. Cl. .................. 348/222.1; 348/231.3
(58) Field of Classification Search .............. 348/222.1, 348/213, 231.3; 396/213
See application file for complete search history.

(56) References Cited

U.S. PATENT DOCUMENTS

| 7,057,645 B1* | 6/2006 | Hara et al. ................. 348/208.6 |
| 2005/0219393 A1 | 10/2005 | Sugimoto |
| 2007/0242138 A1* | 10/2007 | Manico et al. ............. 348/231.3 |

FOREIGN PATENT DOCUMENTS

| JP | 2002358522 A | * 12/2002 |
| JP | 2004-112390 A | 4/2004 |

* cited by examiner

*Primary Examiner* — Timothy J Henn
*Assistant Examiner* — Yih-Sien Kao
(74) *Attorney, Agent, or Firm* — BIrch, Stewart, Kolasch & Birch, LLP.

(57) ABSTRACT

A plurality of images are obtained in photography according to a plurality of photography methods, and photography result scores are calculated for the respective images. Judgment is made as to whether a highest score among the scores calculated for the respective images is equal to or larger than a predetermined threshold value. If a result of the judgment is affirmative, the image having the highest score is recorded in a recording medium. If the result of the judgment is negative, the images are displayed on display means to receive selection of a desired one of the images. The selected image is recorded in the recording medium.

6 Claims, 7 Drawing Sheets

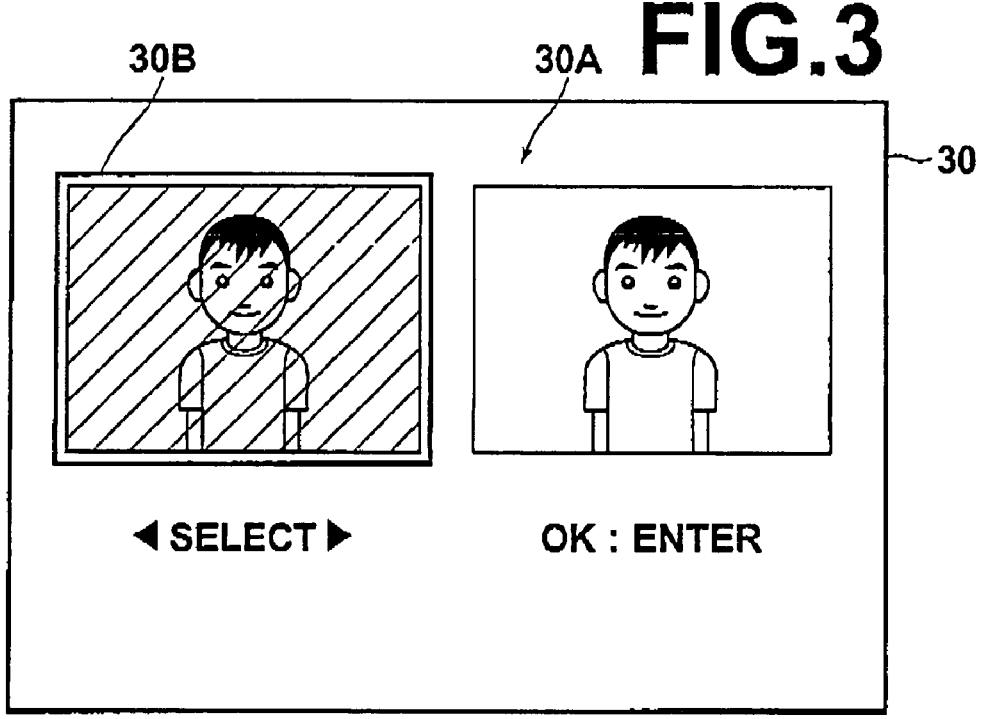
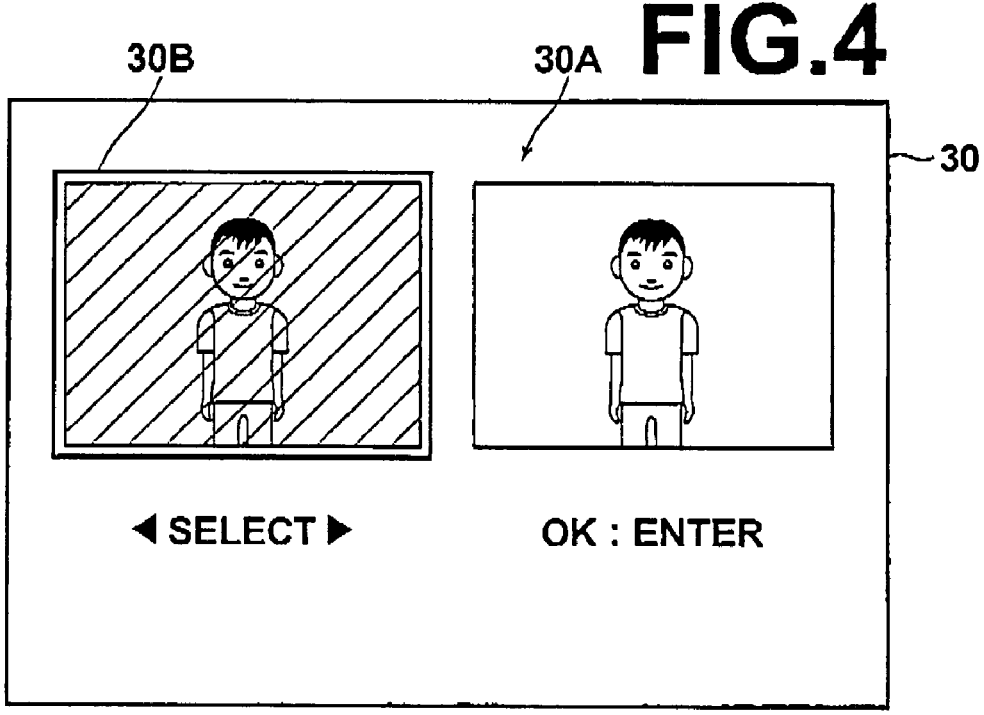

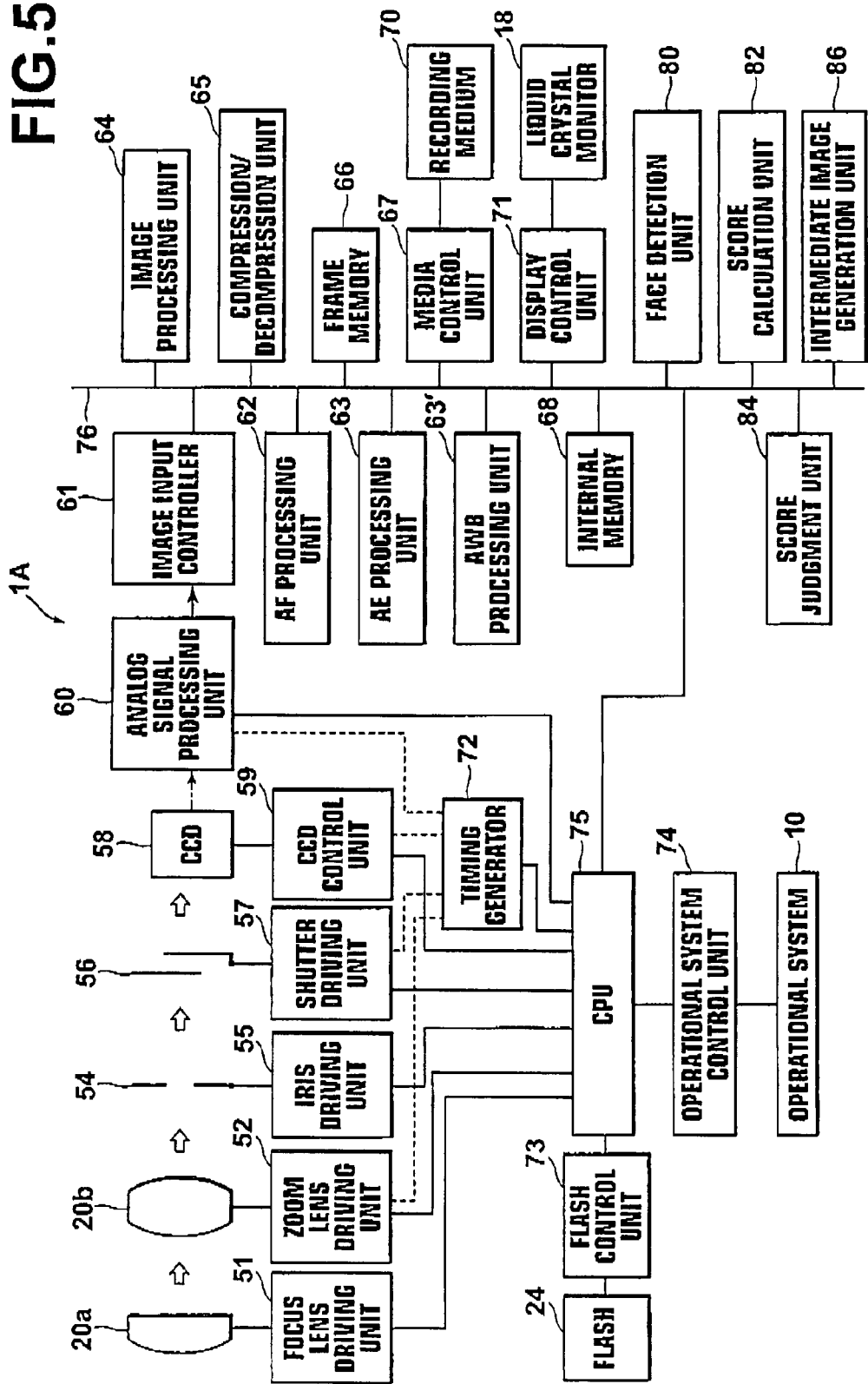

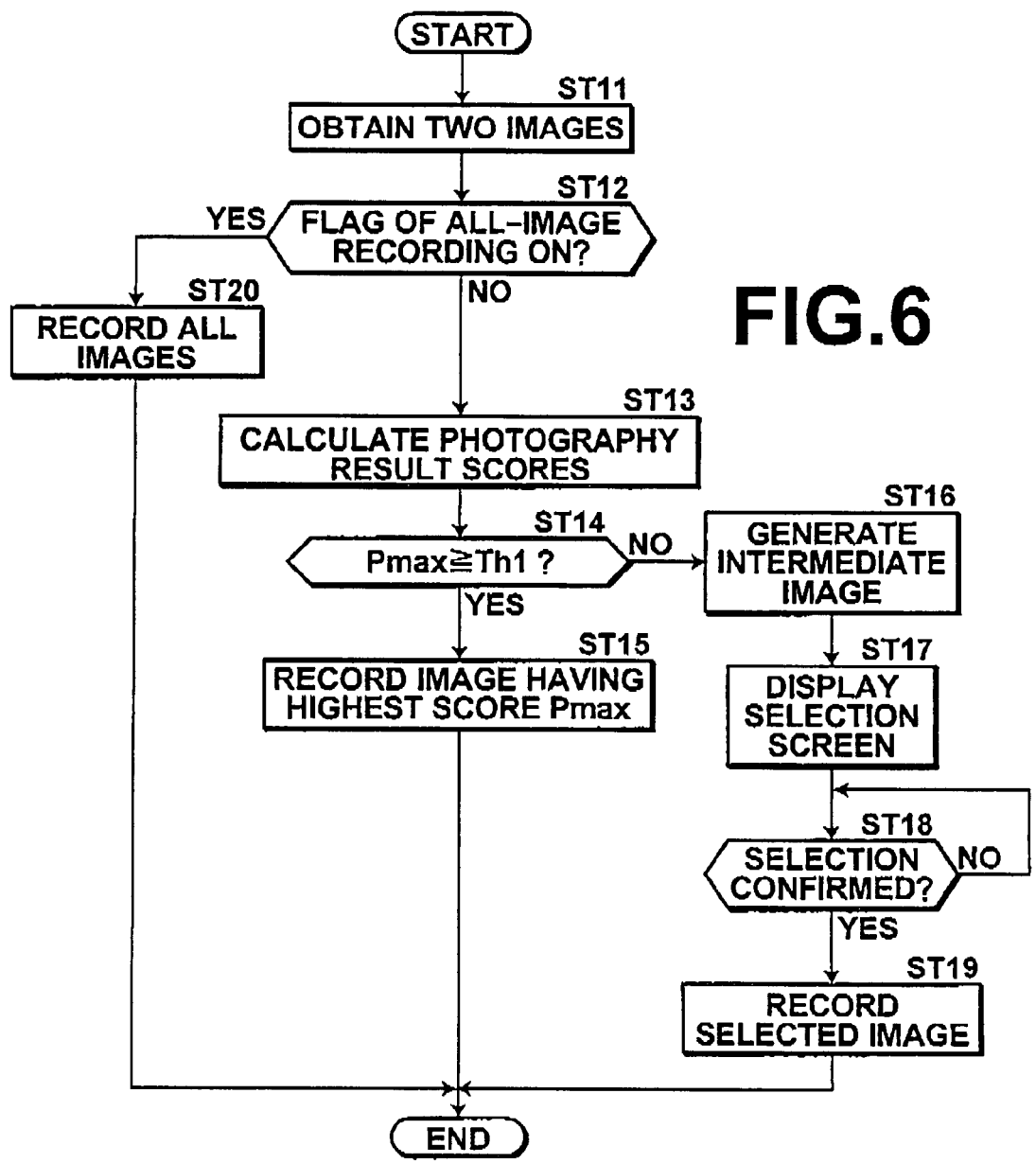

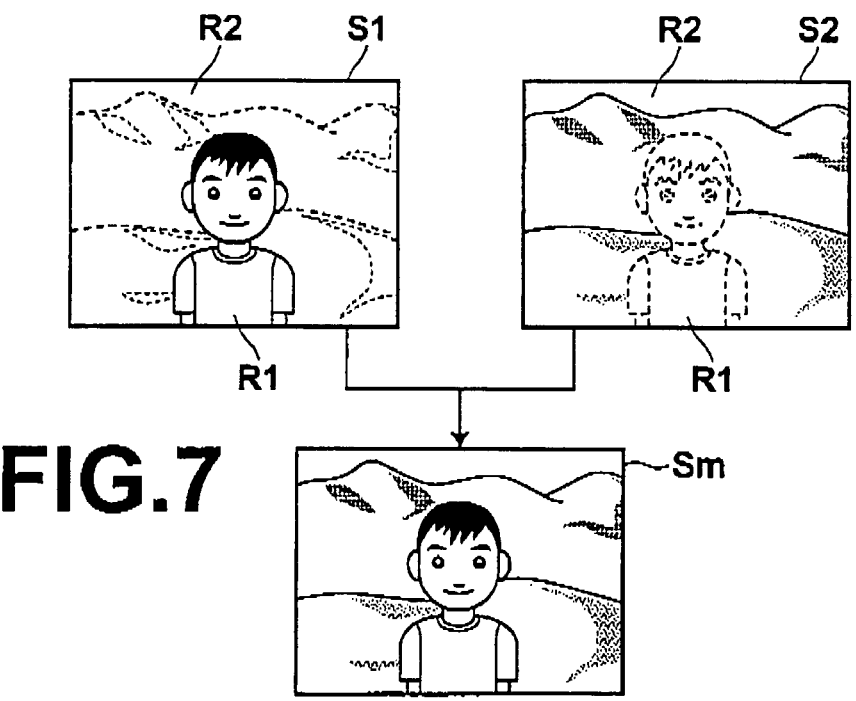
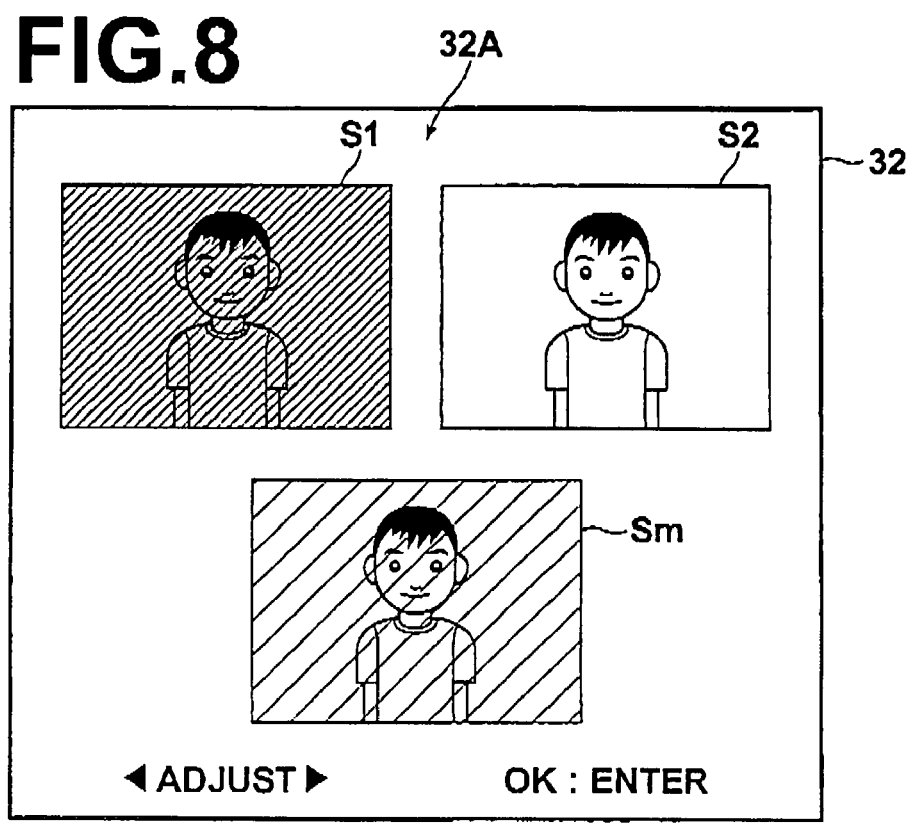

APPARATUS, METHOD AND PROGRAM FOR PHOTOGRAPHY

BACKGROUND OF THE INVENTION

1. Field of the Invention

The present invention relates to a photography apparatus and a photography method for obtaining an image by photography. The present invention also relates to a program that causes a computer to execute the photography method.

2. Description of the Related Art

In the case of photography with digital cameras, images are obtained by setting photography conditions such as exposure, in-focus position, and flash emission as well as image processing conditions such as gradation correction, color correction, and white balance. In this manner, high quality images can be obtained. In addition, images are obtained by setting the photography conditions and the image processing conditions so as to cause main subjects such as human faces instead of the entire images to have preferable quality.

The photography conditions and the image processing conditions are determined by analyzing preliminary images or final images obtained by preliminary photography or actual photography. However, the photography conditions and the image processing conditions cannot be set appropriately in some cases due to failure of the analysis. For example, if analysis of exposure and in-focus position fails, the photography conditions cannot be set appropriately. Therefore, resultant images may be blurry or have regions wherein white compression is observed. In the case of failure of analysis of the degree of correction of white balance, images may look like scenes in daylight despite the fact that tungsten lights were used for photography, for example. In these cases, images of desired quality cannot be obtained.

Meanwhile, a method has been proposed wherein an image is generated at the time of printing by correcting red eyes occurring in flash photography and displayed together with the image before the correction to let a photographer select either one of the images (see Japanese Unexamined Patent Publication No. 2004-112390). In addition, a method for enabling easier confirmation of a photographed image by display of an enlarged main subject included in the image on a monitor of a digital camera has also been proposed (see U.S. Patent Application Publication No. 20050219393). According to these methods, a displayed image can be confirmed, and a photographer can continue photography until he/she is satisfied. Therefore, desired images can be obtained.

However, confirming a displayed image at each time of photography is substantially troublesome for a photographer.

SUMMARY OF THE INVENTION

The present invention has been conceived based on consideration of the above circumstances, and an object of the present invention is therefore to easily obtain a desired image.

A photography apparatus of the present invention comprises:

photography means for obtaining an image by photography;

display means for carrying out various kinds of display including the image;

input means for carrying out various kinds of input;

photography control means for controlling the photography means so as to obtain a plurality of images by photography according to a plurality of photography methods;

score calculation means for calculating a score of photography results for each of the images;

score judgment means for carrying out judgment as to whether a highest score among the scores calculated for the respective images is equal to or larger than a predetermined threshold value; and recording control means for recording the image having the highest score in a recording medium in the case where a result of the judgment is affirmative and for receiving an instruction to select a desired one of the images by display of the images on the display means in the case where the result of the judgment is negative and for recording the selected image in the recording medium.

As the "score of photography results", at least one of a main subject detection score, a skin-color detection score, an environmental light-source detection score, an object-color detection score, and a backlight score can be used. As the main subject detection score, a value representing a degree of how likely a subject included in each of the images is a main subject such as a human face can be used. As the skin-color detection score, a value representing a degree of how likely a skin color included in each of the images is a preferable skin color can be used. As the environmental light-source detection score, a value representing a degree of how likely an environmental light source obtained by analysis of each of the images is a predetermined environmental light source can be used. As the object-color detection score, a value representing a degree of how likely a color of an object included in each of the images is a predetermined object color can be used. As the backlight score, a value representing a degree of how likely each of the images is a non-backlighted image can be used. In addition, an "expression score" may be employed as the "score of photography results" in the case that the main subject of photography is a face. Note that the degree to which the face in the image is smiling may be used as the "expression score", for example.

In the photography apparatus of the present invention, the photography control means may control the photography means so as to obtain two images. In this case, the photography apparatus of the present invention may further comprise intermediate image generation means for generating an intermediate image between the two images. The recording control means then displays the intermediate image together with the two images on the display means in such a manner that the intermediate image can be adjusted according to an instruction from the input means in the case where the result of the judgment is negative, and receives an instruction to select a desired intermediate image.

The term "intermediate image" refers to an image having content which is between the two images. For example, the "intermediate image" may be that having image quality of a level between those of the two images. As another example, the "intermediate image" may be an image in which the expression of a face pictured therein is between the expressions of faces pictured in the two images.

In the photography apparatus of the present invention, the photography methods may be photography methods wherein at least one of exposure, in-focus position, flash emission, gradations, color correction, and white balance is different from each other. Note that the photography methods may also be methods that obtain images such that the expressions of faces pictured therein are different.

In the photography apparatus of the present invention, the recording control means may display a region of a main subject in each of the images on the display means by enlarging the region in the case where the result of the judgment is negative.

A photography method of the present invention is a photography method for a photography apparatus having photography means for obtaining an image by photography, display means for carrying various kinds of display including the image, and input means for carrying out various kinds of input, and the method comprises the steps of:

obtaining a plurality of images by photography according to a plurality of photography methods;

calculating a score of photography results for each of the images;

carrying out judgment as to whether a highest score among the scores calculated for the respective images is equal to or larger than a predetermined threshold value;

recording the image having the highest score in a recording medium in the case where a result of the judgment is affirmative;

receiving an instruction to select a desired one of the images by display of the images on the display means in the case where the result of the judgment is negative; and recording the selected image in the recording medium.

The photography method of the present invention may be provided as a program that causes a computer to execute the method.

According to the present invention, the plurality of images are obtained by photography according to the plurality of photography methods, and the photography result scores are calculated for the respective images. The judgment is then made as to whether the highest score among the scores calculated for the respective images is equal to or larger than the predetermined threshold value. If the result of this judgment is affirmative, the image having the highest score is recorded in the recording medium. If the result is negative, the images are displayed on the display means and selection of a desired one of the images is received to record the selected image in the recording medium. Therefore, a photographer can record the image of high score in the recording medium without confirmation of all the images obtained in the photography. In this manner, the photographer can easily obtain the image having desired content without much effort.

In the case where the two images are obtained, if the result of the judgment as to whether the highest score is equal to or larger than the predetermined threshold value is negative, the intermediate image between the two images is generated and displayed on the display means such that it is adjustable. Thereby, the photographer can generate and record in the recording medium the desired intermediate image.

In the case where the result of the judgment as to whether the highest score is equal to or larger than the predetermined threshold value is negative, quality of the main subject in each of the images can be confirmed easily by display of the enlarged main subject region therein.

BRIEF DESCRIPTION OF THE DRAWINGS

FIG. 3 shows a selection screen in the first embodiment (example 1);

FIG. 4 shows the selection screen in the first embodiment (example 2);

FIG. 5 is a block diagram showing the configuration of a digital camera adopting a photography apparatus of a second embodiment of the present invention;

FIG. 6 is a flow chart showing processing carried out in the second embodiment;

FIG. 7 shows how an intermediate image is generated from two images obtained by using different in-focus positions;

FIG. 8 shows a selection screen in the second embodiment;

DESCRIPTION OF THE PREFERRED EMBODIMENTS

Figure 1:
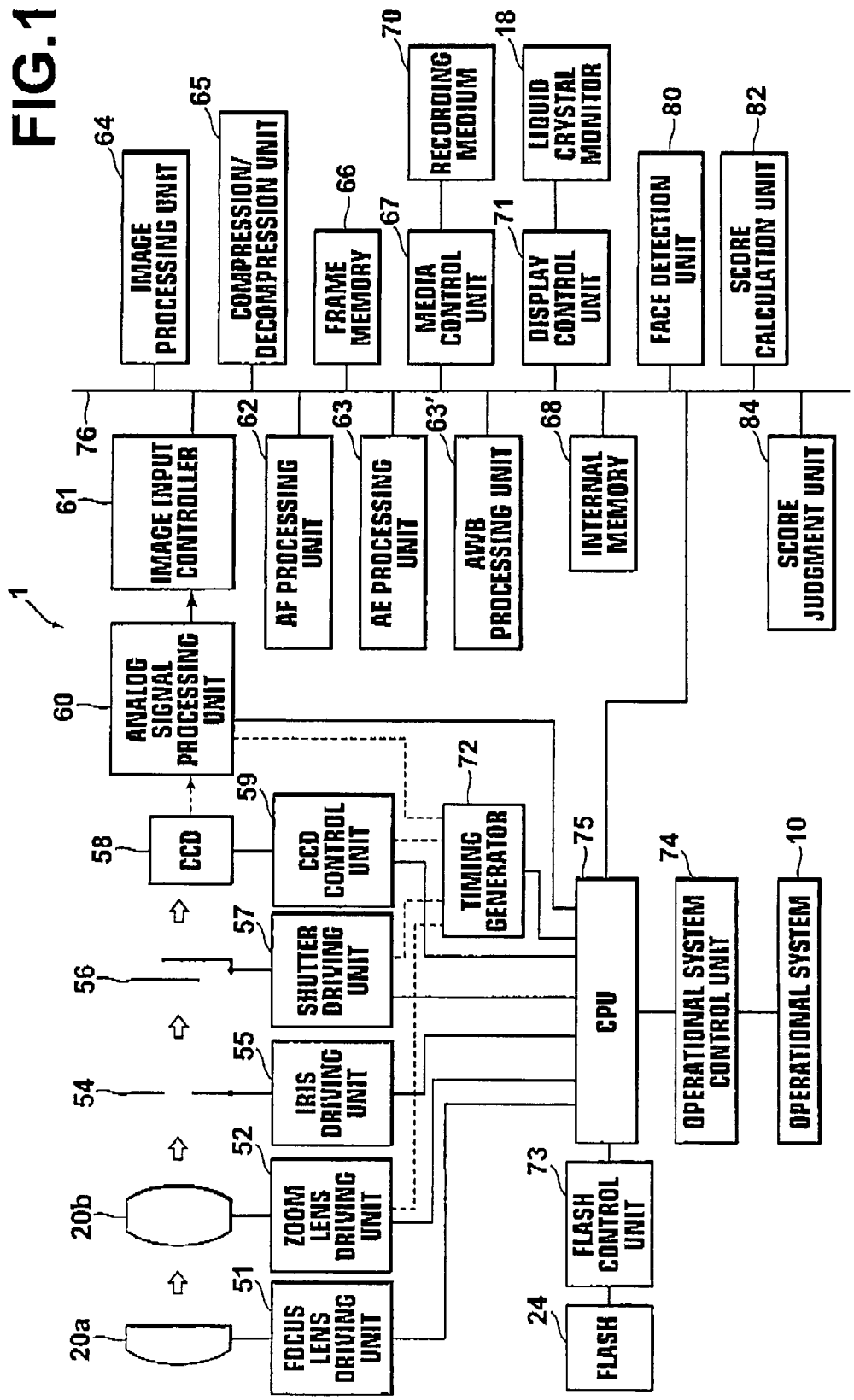
FIG. 1 is a block diagram showing the configuration of a digital camera adopting a photography apparatus of a first embodiment of the present invention.

Hereinafter, embodiments of the present invention will be described with reference to the accompanying drawings. FIG. 1 is a block diagram showing the configuration of a digital camera adopting a photography apparatus of a first embodiment of the present invention. A digital camera 1 shown in FIG. 1 records image data obtained in photography in a recording medium 70 that can be attached to and detached from the camera, by converting the image data into an image file of the Exif format.

The digital camera 1 comprises an operational system 10 including an operation mode switch, a Menu/OK button, a zoom lever, a cruciform key, a release button, and a power switch, and an operational system control unit 74 that functions as an interface for sending the contents of operations of the operational system to a CPU 75.

In this embodiment, a multiple image photography mode for obtaining a plurality of images by setting a plurality of photography methods is available as an operation mode, in addition to a photography mode and a playback mode.

The digital camera 1 also has a focus lens 20a and a zoom lens 20b that constitute an optical system. The lenses can be moved along an optical axis by a focus lens driving unit 51 and a zoom lens driving unit 52 each comprising a motor and a motor driver. The focus lens driving unit 51 and the zoom lens driving unit 52 control the movement of the corresponding lenses based on focus driving data outputted from an AF processing unit 62 and based on data representing operation of the zoom lever, respectively.

An iris 54 is driven by an iris driving unit 55 comprising a motor and a motor driver. The iris driving unit 55 adjusts a diameter of the iris 54 based on iris-value data outputted from an AE (Automatic Exposure) processing unit 63.

A shutter 56 is a mechanical shutter and driven by a shutter driving unit 57 comprising a motor and a motor driver. The shutter driving unit 57 opens and closes the shutter 56 according to a signal generated by pressing down the release button and shutter speed data outputted from the AE processing unit 63.

A CCD 58 as an imaging device is located at the rear of the optical system. The CCD 58 has a photoelectric surface whereon a plurality of photoreceptor elements are arranged two-dimensionally. A light from a subject passing through the optical system forms an image on the surface and is subjected to photoelectric conversion. A micro-lens array for focusing the light on each pixel and a color filter array, wherein filters for R, G, and B colors are arranged regularly, are located in front of the photoelectric surface. The CCD 58 outputs an electric charge stored at each of the pixels as serial analog image signal for each line while synchronizing with a vertical transfer clock signal and a horizontal transfer clock signal supplied from a CCD control unit 59. The time during which the electric charge is stored at each of the pixels, that is, an exposure time is determined by an electronic shutter driving signal outputted from the CCD control unit 59. The CCD control unit 59 adjusts a gain of the CCD 58 so as to obtain the signal of a predetermined magnitude.

The analog image signal from the CCD 58 is inputted to an analog signal processing unit 60. The analog signal processing unit 60 comprises a correlated double sampling (CDS) circuit for removing noise from the analog image signal, an automatic gain controller (AGC) for adjusting a gain of the analog image signal, and an A/D converter (ADC) for converting the analog image signal into a digital image signal. The image data converted into the digital image signal are CCD-RAW data having density values of R, G, and B for each of the pixels.

A timing generator 72 generates a timing signal. Feeding of the timing signal to the shutter driving unit 57, the CCD control unit 59, and the analog signal processing unit 60 synchronizes operation of the release button, the opening/closing of the shutter 56, input of the electric charge of the CCD 58, and processing by the analog signal processing unit 60.

A flash control unit 73 causes a flash 24 to emit a light at the time of photography. More specifically, in the case where a flash emission mode is flash-on mode and in the case where a preliminary image that will be described later does not have predetermined lightness when the flash emission mode is automatic mode, the flash control unit 73 causes the flash 24 to emit a light at the time of photography. In the case where the flash emission mode is flash-off mode, the flash control unit 73 prohibits light emission from the flash 24 at the time of photography.

An image input controller 61 writes the CCD-RAN data inputted from the analog signal processing unit 60 in a frame memory 66.

The frame memory 66 is a memory used as workspace for various kinds of digital image processing (signal processing) on the image data that will be described later. The frame memory is an SDRAM (Synchronous Dynamic Random Access Memory) that carries out data transfer in synchronization with a bus clock signal of a predetermined period, for example.

A display control unit 71 is used to display the image data stored in the frame memory 66 as a throughput image on a liquid crystal monitor 18. In the playback mode, the display control unit 71 also displays image data stored in the recording medium 70 on the liquid crystal monitor 18. The throughput image is photographed at predetermined intervals by the CCD 58 in the photography mode.

The AF processing unit 62 and the AE processing unit 63 determine photography conditions based on the preliminary image. The preliminary image is an image represented by the image data stored in the frame memory 66 as a result of preliminary photography carried out by the CCD 58 instructed by the CPU 75 that has detected a half-press signal generated by half press of the release button.

The AF processing unit 62 detects a focal position based on the preliminary image, and outputs the focus driving data (AF processing). As a method of detection of the focal position, a passive method may be used, for example. In a passive method, an in-focus position is detected by using a characteristic that contrast of an image becomes high in a state of in-focus on a desired subject.

The AE processing unit 63 measures luminance of the subject based on the preliminary image, and determines an iris value, a shutter speed, and the like based on the measured luminance. The AE processing unit 63 then outputs the data of the iris value and the shutter speed as an exposure value (AE processing).

An AWB processing unit 63' automatically adjusts white balance at the time of photography (AWB processing). The AWB processing unit 63' can adjust white balance before photography and after actual photography.

A photographer using the digital camera 1 can manually set exposure and white balance in the case where the photography mode is manual mode. In the case where exposure and white balance have been set automatically, the photographer can manually adjust the exposure and white balance by instruction from the operational system 10.

An image processing unit 64 carries out image quality enhancement processing such as gradation correction, sharpness correction, and color correction on data of a final image. The image processing unit 64 also carries out YC processing to convert the CCD-RAW data into YC data comprising Y data as a luminance signal, Cb data as a blue color difference signal, and Cr data as a red color difference signal. The final image is an image based on the image data inputted from the CCD 58 and stored in the frame memory 66 via the analog signal processing unit 60 and the image input controller 61, in actual photography carried out by full press of the release button. The maximum number of pixels of the final image is decided by the number of the pixels of the CCD 58. However, the number of pixels to be recorded can be changed by setting to fine or normal image quality, for example. The number of pixels of the throughput image and the preliminary image may be smaller than that of the final image, and is $\frac{1}{16}$ of the final image, for example.

A compression/decompression unit 65 carries out compression processing in a format such as JPEG on the final image data having been subjected to the image enhancement processing and the conversion by the image processing unit 64, and generates the image file. A tag storing accompanying information such as time and date of photography is added to the image file according to the Exif format or the like. The compression/decompression unit 65 also reads a compressed image file from the recording medium 70 in the playback mode, and carries out decompression processing thereon. The decompressed image data are outputted to the liquid crystal monitor 18.

A media control unit 67 controls image-file reading and writing by accessing the recording medium 70.

An internal memory 68 stores various kinds of constants set in the digital camera 1, a program executed by the CPU 75, and the like.

The CPU 75 controls each of the units in the digital camera 1 according to the signals from each of the processing units such as the AF processing unit 62 and from the operational system 10. In the case where the multiple image photography mode has been set, the CPU 75 controls each of the processing units in the digital camera 1 so as to obtain the plurality of images (n images) by photography according to the plurality of photography methods (n methods) in response to single full press of the release button. In other words, the CPU 75 controls each of the processing units so as to obtain the plurality of images by setting at least one of exposure, in-focus position, flash emission, gradations, and white balance in a plurality of manners.

More specifically, for exposure, the CPU 75 controls the AE processing unit 63 to set the exposure value in stepwise manner around the determined exposure value, that is, several values smaller and/or larger than the determined value. For in-focus position, the CPU 75 controls the AF processing unit 62 to use several positions shorter and/or longer than the determined focal position as the in-focus position. For flash emission, the CPU 75 also controls the flash control unit 73 so as to allow/prohibit light emission from the flash 24. For gradations and color correction, the CPU 75 controls the image processing unit 64 so as to carry out gradation correction and color correction in several manners. For white balance, the CPU 75 controls the AWB processing unit 63' to carry out white balance adjustment in several manners.

The CPU 75 receives a setting instruction from the photographer regarding whether all the images obtained in photography are recorded in the recording medium 70. In the case where the photographer instructs to record all the images, the CPU 75 turns on a flag of all-image recording in the internal memory 68.

A face detection unit 80 detects a region of human face in each of the images, for calculation of a score that will be described later. More specifically, the face detection unit 80 calculates a plurality of characteristic quantities in a detection frame at every position thereof in each of the images while gradually moving the detection frame in the image, and carries out matching with predetermined face characteristic quantities. The face detection unit 80 detects the position of the detection frame at which a matching degree exceeds a predetermined threshold value as a face region. By changing a size of the detection frame, the face region can be detected in various sizes.

The method of face detection is not necessarily limited to the method described above, and any method can be used. For example, a rectangular region surrounding a face outline shape and having a skin color may be detected as a face region, or a region having a face outline shape may be detected as a face region.

A score calculation unit 82 calculates a photography result score Psi (i=1~n, where n is the number of images) regarding each of the images obtained in the above manner. More specifically, the score calculation unit 82 calculates a face detection score P1, a skin-color detection score P2, an environmental light-source detection score P3, an object-color detection score P4, and a backlight score P5, and finds a weighted addition of the scores as the photography result score Psi for each of the images.

As the face detection score P1, the degree of matching calculated by the face detection unit 80 is used as it is.

As the skin-color detection score P2, the reciprocal of a distance in a color space between a skin color in the face region detected by the face detection unit 80 and a skin color that has been set as a most preferable skin color is used. The color space may be any color space, such as an RGB or Lab color space.

For the environmental light-source detection score P3, a color temperature of each of the images is calculated from RGB values of each of the pixels therein, and a largest value among reciprocals of differences between the calculated color temperature and color temperatures of predetermined environmental light sources such as a daylight, a tungsten light, and a fluorescent light is used as the environmental light-source detection score. The color temperatures of the predetermined light sources are stored in advance in the internal memory 68.

As the object-color detection score P4, a similarity of a surface reflectance of an object in each of the images to that of a predetermined object is used. A color of an object in each of the images is represented by Equation (1) below:

$$R = \int_\Omega S(\lambda)E(\lambda)q_r(\lambda)d\lambda \quad (1)$$

where $\Omega$ is an integrating range, $\lambda$ is the wavelength of light, $R$, $S(\lambda)$, $E(\lambda)$, $qc(\lambda)$ are the pixel value of R in the object, the surface reflectance thereof, spectral distribution of a light source, and a spectral sensitivity characteristic of the CCD 58 (c refers to r, g, and b), respectively. In Equation (1), only the color R is shown. However, the colors G and B can be calculated in the same manner.

In Equation (1) above, R can be obtained from the image. $E(\lambda)$ can be obtained at the time of acquisition of the environmental light-source detection score, while $qc(\lambda)$ is known for the CCD 58 and stored in the internal memory 68. Therefore, the surface reflectance $S(\lambda)$ of the object can be calculated according to Equation (1). The surface reflectance is calculated for each of RGB colors.

In this embodiment, surface reflectances $S_j(\lambda)$ for predetermined objects of a plurality of types (j=1~m, where m is the number of the predetermined objects) have been stored in the internal memory 68. The score calculation unit 82 calculates a similarity degree $Q_j$ of the surface reflectance $S(\lambda)$ of the object in the image calculated according to Equation (1) above to the surface reflectance $S_j(\lambda)$ of each of the predetermined objects according to Equation (2) below, for each of RGB colors:

$$Q_j = \frac{2\int_\Omega S(\lambda)S_j(\lambda)d\lambda}{\int_\Omega S^2(\lambda)d\lambda + \int_\Omega S_j^2(\lambda)d\lambda} \quad (2)$$

The score calculation unit 82 determines a largest similarity degree Qmax among the calculated similarity degrees $Q_j$, and uses the largest degree as the object-color detection score.

The backlight score P5 is the reciprocal of a difference between lightness of the face region detected by the face detection unit 80 and lightness of a surrounding region. The lightness of the face region is a mean value of lightness of all pixels in the face region while the lightness of the surrounding region is a mean value of lightness of all pixels in a region of a predetermined range surrounding the face region.

The score calculation unit 82 carries out weighted addition of the face detection score P1, the skin-color detection score P2, the environmental light-source detection score P3, the object-color detection score P4, and the backlight score P5 calculated for each of the images by using weight coefficients W1 to W5, and calculates the photography result score Psi according to Equation (3) below:

$$Psi = W1P1 + W2P2 + W3P3 + W4P4 + W5P5 \quad (3)$$

Note that the weighting coefficients W1 to W5 may be set based on empirical values, or according to the tastes of the photographer.

A score judgment unit 84 determines a highest score Pmax among the photography result scores Psi calculated by the score calculation unit 82, and judges whether the highest score Pmax is equal to or larger than a threshold value Th1. The score judgment unit 84 outputs a result of the judgment to the CPU 75.

A data bus 76 is connected to the image input controller 61, the processing units 62 to 65, the frame memory 66, the media control unit 67, the internal memory 68, the display control unit 71, the face detection unit 80, the score calculation unit 82, and the CPU 75, for exchange of the digital image data and the like.

Figure 2:
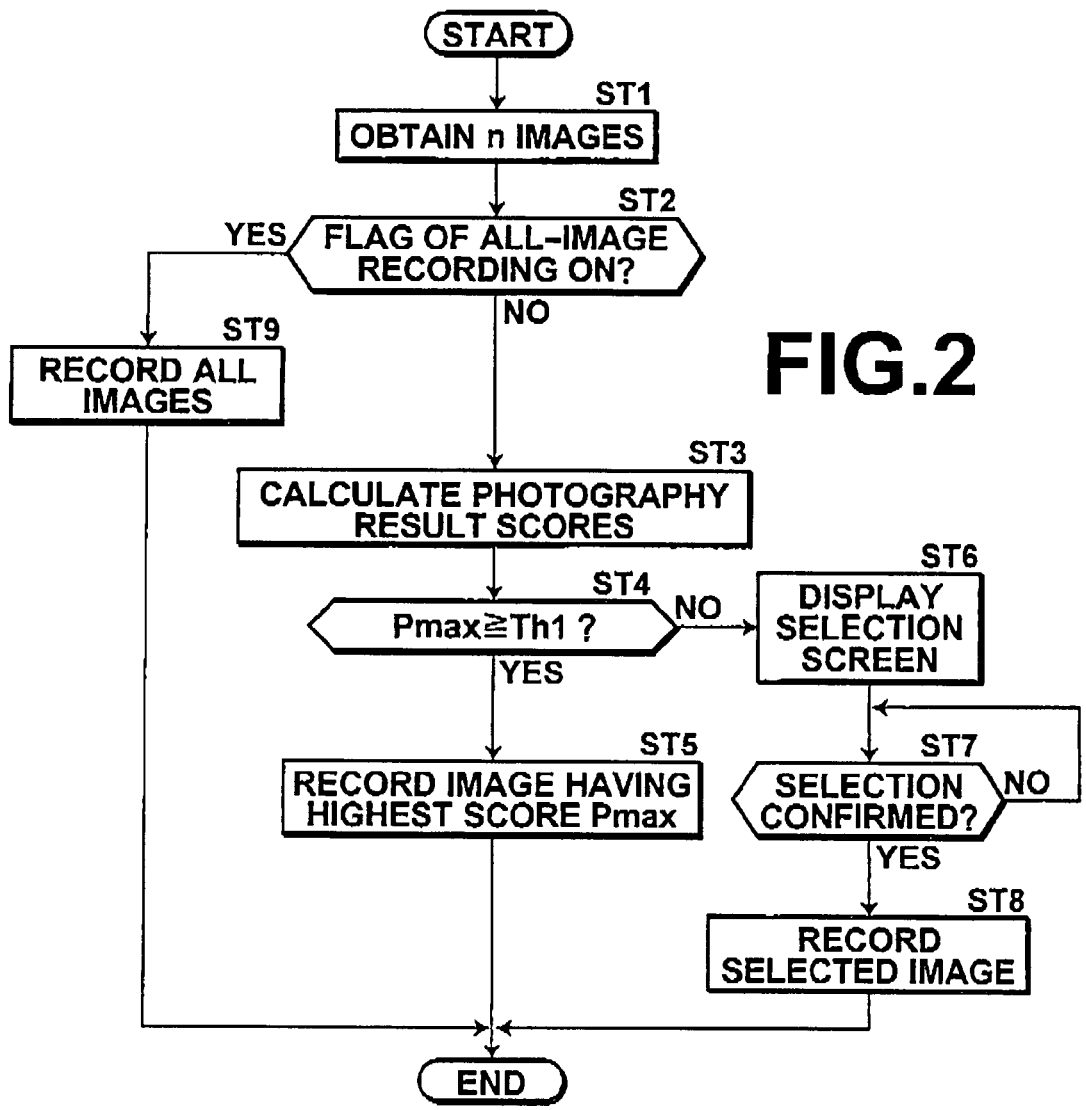
FIG. 2 is a flow chart showing processing carried out in the first embodiment.

Processing carried out in the first embodiment will be described next. FIG. 2 is a flow chart showing the processing. The multiple image photography mode has been set in this example. When the photographer fully presses the release button, the CPU 75 starts the processing, and the n images are obtained by actual photography according to the n methods (Step ST1).

The CPU 75 judges whether the flag of all-image recording in the internal memory 68 is ON (Step ST2). If a result of the judgment at Step ST2 is negative, the score calculation unit 82 calculates the photography result scores for the n images (Step ST3). The score judgment unit 84 judges whether the highest score Pmax is equal to or larger than the threshold value Th1 (Step ST4). If a result at Step ST4 is affirmative, the CPU 75 records the image having the highest score Pmax in the recording medium 70 (Step ST5) to end the processing.

If the result at Step ST4 is negative, a selection screen for letting the photographer carry out image selection is displayed on the liquid crystal monitor 18 (Step ST6). FIG. 3 shows the selection screen in the first embodiment. As shown in FIG. 3, the selection screen has a display area 30A for image display. In this example, two images are shown in the display area 30A. However, only one image or a catalog of thumbnail images may be displayed therein. The face region in each of the images is shown by being enlarged. However, the entire images may be displayed as shown in FIG. 4, without enlargement of the face regions.

In FIGS. 3 and 4, triangle marks to the right and left of the characters "Select" indicate that the images can be selected by pressing the right and left directional arrows of the cruciform key. The characters "OK: Enter" refer to that the image selection can be confirmed by pressing the OK button.

The photographer can display the n images while changing the images to be displayed in the display area 30A by operation of the operational system 10. A frame 30B is added to the image currently selected. By confirming the selection with use of the operational system 10 in a state where the desired image is currently selected, the photographer can confirm the selection of the desired image.

The CPU 75 starts monitoring on whether the image selection by the photographer has been confirmed (Step ST7). If a result at Step ST7 is affirmative, the CPU 75 records the image selected by the photographer in the recording medium 70 (Step ST8) to end the processing.

If the result at Step ST2 is affirmative, all the images are recorded in the recording medium 70 (Step ST9) to end the processing.

As has been described above, according to this embodiment, the photography result scores are calculated for the respective images obtained by the plurality of methods, and the image having the highest score Pmax is recorded in the recording medium 70 in the case where the highest score Pmax is equal to or larger than the threshold value Th1. In the case where the highest score Pmax is smaller than the threshold value Th1, the images are displayed on the liquid crystal monitor 18 for letting the photographer select a desired one of the images. Therefore, the photographer can record the image of high photography result score in the recording medium 70, without confirmation of all the images obtained in photography. Therefore, the photographer can easily obtain the image of desired quality without much effort.

A second embodiment of the present invention will be described next. FIG. 5 is a block diagram showing the configuration of a digital camera adopting a photography apparatus of the second embodiment. In the second embodiment, the same elements as in the first embodiment have the same reference codes, and detailed description thereof will be omitted. A digital camera 1A in the second embodiment is different from the first embodiment in that two photography methods are adopted and the camera has an intermediate image generation unit 86 for generating an intermediate image having intermediate quality between two images obtained according to the two methods.

Processing carried out in the second embodiment will be described below. FIG. 6 is a flow chart showing the processing in the second embodiment. The multiple image photography mode for photographing two images has been set. When a photographer fully presses the release button, the CPU 75 starts the processing. The two images are obtained in actual photography carried out twice according to the two photography methods (Step ST11).

The CPU 75 judges whether the flag of all-image recording is ON in the internal memory 68 (Step ST12). If a result of judgment at Step ST12 is negative, the score calculation unit 82 calculates the photography result scores of the two images (Step ST13). The score judgment unit 84 judges whether the highest score Pmax is equal to or larger than the threshold value Th1 (Step ST14). If a result at Step ST14 is affirmative, the CPU 75 records the image having the highest score Pmax in the recording medium 70 (Step ST15) to end the processing.

If the result at Step ST14 is negative, the intermediate image generation unit 86 generates the intermediate image having intermediate quality between the two images (Step ST16), and the CPU 75 displays a selection screen for letting the photographer carry out image selection on the liquid crystal monitor 18 (Step ST17).

The intermediate image has the intermediate quality between the two images. For example, in the case where exposure is different between the two photography methods and in the case where the two photography methods is flash photography and photography without using a flash, lightness is different between the two images obtained in the photography. Therefore, the intermediate image generation unit 86 generates an image having intermediate lightness between the two images. In the case where gradations are different between the two images, the intermediate image generation unit 86 generates an intermediate image having intermediate gradations between the two images. In the case where white balance is different, the intermediate image having intermediate white balance between the two images is generated.

In the case where the in-focus position is different between the two images, regions of the two images at where the images are in focus are selected from each of the two images. Then, the intermediate image generation unit 86 generates the intermediate image by compositing the selected in-focus regions from the two images, as shown in FIG. 7. In an image S1 shown in FIG. 7, only a human figure region R1 is in-focus while only a background region R2 in an image S2 in FIG. 7 is in-focus. Therefore, the intermediate image generation unit 86 cuts the regions R1 and R2 from the images S1 and S2, and composites the regions R1 and R2 to generate an intermediate image Sm.

FIG. 8 shows the selection screen in the second embodiment. As shown in FIG. 8, a selection screen 32 has a display area 32A for image display. In the display area 32A, the images S1, S2, and Sm whose face regions have been enlarged are displayed. The photographer can change the image quality of the intermediate image Sm between the quality of the images S1 and S2 by operating the operational system 10. For example, in the case where lightness is different between the two images, the photographer can change the lightness of the intermediate image. Likewise, in the case where white balance, colors, or gradations is/are different between the two images, the photographer can change the quality of the intermediate image Sm by changing white balance, colors, or gradations, respectively. In the example shown in FIG. 8, the face regions in the images are enlarged. However, as in the first embodiment, the entire images may be displayed without enlargement of the face regions.

In FIG. 8, triangle marks to the right and left of the characters "Adjust" indicate that the quality of the intermediate image can be changed by pressing the right and left directional arrows of the cruciform key. The characters "OK: Enter" refer to that the image selection can be confirmed by pressing the OK button.

By operation of the operational system 10, the photographer can change the quality of the intermediate image for display thereof in the display area 32A. When the intermediate image of desired quality is displayed, the photographer can confirm the selection by operation of the operational system 10. In this manner, the photographer can confirm the selection of the intermediate image having the desired quality.

The CPU 75 starts monitoring on whether the image selection by the photographer has been confirmed (Step ST18). If a result at Step ST18 is affirmative, the CPU 75 records the intermediate image selected by the photographer in the recording medium 70 (Step ST19) to end the processing.

If the result at Step ST12 is affirmative, the CPU 75 records all the images in the recording medium 70 (Step ST20) to end the processing.

As has been described above, in the second embodiment, the intermediate image having intermediate quality between the two images is generated and displayed together with the two images in the manner that the intermediate image can be adjusted. Therefore, the photographer can generate the intermediate image having preferable quality and record the image in the recording medium 70.

In the first and second embodiments described above, all the face detection score, the skin-color detection score, the environmental light-source detection score, the object-color detection score, and the backlight score have been calculated. However, at least one of these scores may be calculated.

In the photography methods in the first and second embodiments described above, at least one of exposure, in-focus position, flash emission, gradations, color correction, and white balance is changed in several manners. However, a plurality of photometry methods may be used. For example, two images may be obtained by a photometry method measuring an entire image and by a photometry method measuring a face region with emphasis.

Figure 9:
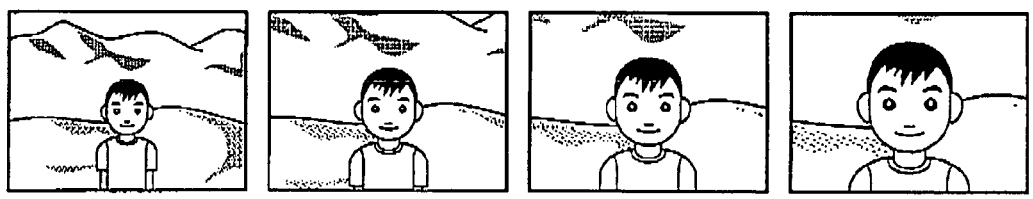
FIG. 9 shows four images having different zoom magnifications.

The photography methods may have different zoom magnifications. In this case, as shown in FIG. 9, four images in different magnifications are obtained in photography.

In the first and second embodiments described above, a main subject is a human face, and the face detection score is calculated. However, a subject other than human face may be a main subject and a detection score for the main subject may be calculated.

In the second embodiment, the intermediate image is generated and recorded in the recording medium 70. However, depending on adjustment of image quality, the intermediate image may have the same quality as either one of the two images.

In the first and second embodiments described above, a plurality of photography operations are performed such that conditions such as: exposure, in focus position, flash photography, gradation, color correction and white balance (hereinafter, referred to as "exposure and the like") differ. Alternatively, a plurality for photography operations may be performed such that facial expressions of a subject differ. In this case, the score of photography results Psi may be calculated by adding an expression score to the face detection score P1, the skin color detection score P2, the environmental light source detection score P3, the object-color detection score P4, and the backlight score P5, or by using the expression score by itself. Note that the degree to which the face in the image is smiling may be used as the "expression score". Specifically, correlative values between images obtained by photography and a template representing an ideal smiling face may be used as the "expression score".

Figure 10:
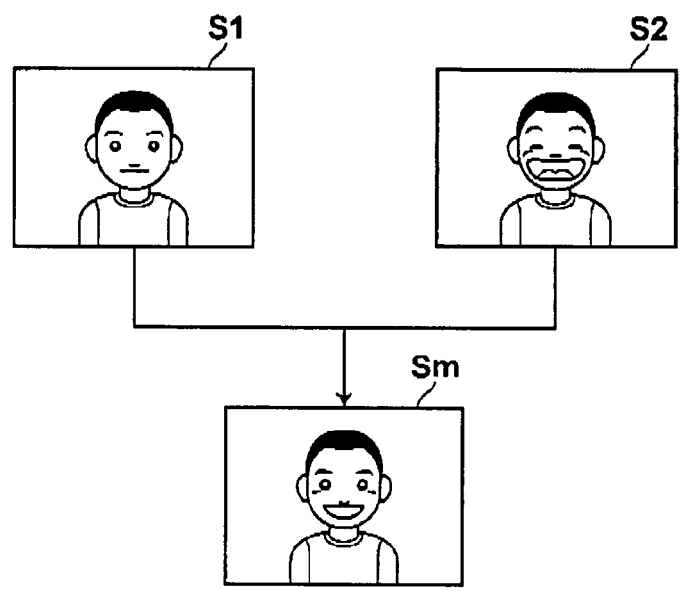
FIG. 10 shows how an intermediate image is generated from two images having faces with different expressions pictured therein.

If the differences in facial expression during photography is applied to the second embodiment, in the case that an image of an expressionless face and an image of a smiling face are obtained by photography, an intermediate image Sm having an expression between expressionless and smiling may be generated, as illustrated in FIG. 10. Thereby, the photographer is enabled to generate an intermediate image representing a face having an expression that he or she finds favorable, then record the intermediate image in the recording medium 70.

In addition, the two photography operations to be performed in the second embodiment are not limited to those in which the exposure and the like or the facial expressions are different. The two photography operations may differ in any manner, as long as the content of the images obtained thereby are different.

Although the digital cameras related to the embodiments of the present invention have been described above, programs that cause a computer to function as means corresponding to the face detection unit 80, the score calculation unit 82, the score judgment unit 84, and the intermediate image generation unit 86 and to execute the processing shown in FIGS. 2 and 6 are also embodiments of the present invention. In addition, computer-readable recording media storing such programs are also embodiments of the present invention.

Note that the program of the present invention may be provided being recorded on a computer readable medium. Those who are skilled in the art would know that computer readable media are not limited to any specific type of device, and include, but are not limited to: CD's, RAM's ROM's, hard disks, magnetic tapes, and internet downloads, in which computer instructions can be stored and/or transmitted. Transmission of the computer instructions through a network or through wireless transmission means is also within the scope of this invention. Additionally, the computer instructions include, but are not limited to: source, object, and executable code, and can be in any language, including higher level languages, assembly language, and machine language.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A photography apparatus comprising:
   photography means for obtaining an image by photography;
   display means for carrying out various kinds of display including the image;
   input means for carrying out various kinds of input;
   photography control means for controlling the photography means so as to obtain a plurality of images by a plurality of photography operations of a same object according to a plurality of photography methods;
   score calculation means for calculating a score of photography results for each of the images;
   score judgment means for carrying out judgment as to whether a highest score among the scores calculated for the respective images is equal to or larger than a predetermined threshold value; and recording control means for recording the image having the highest score in a recording medium in the case where a result of the judgment is affirmative and for receiving an instruction to select a desired one of the images by display of the images on the display means in the case where the result of the judgment is negative and for recording the selected image in the recording medium, wherein the photography control means controls the photography means so as to obtain two images, the photography apparatus further comprises intermediate image generation means for generating an intermediate image between the two images, and the recording control means displays the intermediate image together with the two images on the display means in such a manner that the intermediate image can be adjusted according to an instruction from the input means in the case where the result of the judgment is negative, and receives an instruction to select a desired intermediate image.

2. The photography apparatus according to claim 1, wherein the plurality of photography methods are photography methods wherein at least one of exposure, in-focus position, flash emission, gradations, color correction, and white balance is different from each other.

3. The photography apparatus according to claim 1, wherein the recording control means displays a region of a main subject in each of the images on the display means by enlarging the region in the case where the result of the judgment is negative.

4. A photography method for a photography apparatus having photography means for obtaining an image by photography, display means for carrying various kinds of display including the image, and input means for carrying out various kinds of input, the method comprising the steps of:

obtaining a plurality of images by a plurality of photography operations of a same object according to a plurality of photography methods;

calculating a score of photography results for each of the images;

carrying out judgment as to whether a highest score among the scores calculated for the respective images is equal to or larger than a predetermined threshold value;

recording the image having the highest score in a recording medium in the case where a result of the judgment is affirmative;

receiving an instruction to select a desired one of the images by display of the images on the display means in the case where the result of the judgment is negative; and recording the selected image in the recording medium, wherein the step of obtaining a plurality of images includes obtaining two images, and the photography method further comprises the step of generating an intermediate image between the two images, and displaying the intermediate image together with the two images on the display means in such a manner that the intermediate image can be adjusted according to an instruction from the input means in the case where the result of the judgment is negative, and receives an instruction to select a desired intermediate image.

5. A non-transitory computer-readable recording medium storing a program causing a computer to execute a photography method for a photography apparatus having photography means for obtaining an image by photography, display means for carrying various kinds of display including the image, and input means for carrying out various kinds of input, the program comprising the procedures of:

obtaining a plurality of images by a plurality of photography operations of a same object according to a plurality of photography methods;

calculating a score of photography results for each of the images;

carrying out judgment as to whether a highest score among the scores calculated for the respective images is equal to or larger than a predetermined threshold value;

recording the image having the highest score in a recording medium in the case where a result of the judgment is affirmative;

receiving an instruction to select a desired one of the images by display of the images on the display means in the case where the result of the judgment is negative; and recording the selected image in the recording medium, wherein the procedure of obtaining a plurality of images includes obtaining two images, and the program further comprises the procedures of generating an intermediate image between the two images, and displaying the intermediate image together with the two images on the display means in such a manner that the intermediate image can be adjusted according to an instruction from the input means in the case where the result of the judgment is negative, and receives an instruction to select a desired intermediate image.

6. A photography apparatus comprising:

a photography unit for obtaining an image by photography;

a display unit for carrying out various kinds of display including the image;

an input unit for carrying out various kinds of input;

a photography control unit for controlling the photography unit so as to obtain a plurality of images by a plurality of photography operations of a same object according to a plurality of photography methods;

a score calculation unit for calculating a score of photography results for each of the images;

a score judgment unit for carrying out judgment as to whether a highest score among the scores calculated for the respective images is equal to or larger than a predetermined threshold value; and a recording control unit for recording the image having the highest score in a recording medium in the case where a result of the judgment is affirmative and for receiving an instruction to select a desired one of the images by display of the images on the display unit in the case where the result of the judgment is negative and for recording the selected image in the recording medium, wherein the photography control unit controls the photography unit so as to obtain two images, the photography apparatus further comprises an intermediate image generation unit for generating an intermediate image between the two images, and the recording control unit displays the intermediate image together with the two images on the display unit in such a manner that the intermediate image can be adjusted according to an instruction from the input unit in the case where the result of the judgment is negative, and receives an instruction to select a desired intermediate image.

* * * * *